United States Patent

[11] 3,630,843

| [72] | Inventors | Akira Furuya;<br>Yoshiatsu Aoki, both of Machida-shi; Mikio Takayanagi, Hofu-shi, all of Japan |
|---|---|---|
| [21] | Appl. No. | 745,356 |
| [22] | Filed | July 17, 1968 |
| [45] | Patented | Dec. 28, 1971 |
| [73] | Assignee | Kyowa Hakko Kogyo, Ltd.<br>Tokyo, Japan |
| [32] | Priority | July 19, 1967 |
| [33] | | Japan |
| [31] | | 42/46099 |

[54] PROCESS FOR TREATING A HYDROCARBON FERMENTATION LIQUOR
12 Claims, No Drawings

[52] U.S. Cl..................................................... 195/28 R, 195/96
[51] Int. Cl........................................................ C12b 1/26
[50] Field of Search............................................ 195/109, 142, 1; 252/350; 210/13, 44

[56] References Cited
UNITED STATES PATENTS

| 1,505,944 | 8/1924 | Broadbridge et al. | 210/44 |
| 2,983,677 | 5/1961 | Boyd et al. | 210/44 |
| 3,355,296 | 11/1967 | Perkins et al. | 195/28 X |
| 3,450,599 | 6/1969 | Tanaka et al. | 195/28 |

*Primary Examiner*—A. Louis Monacell
*Assistant Examiner*—Seymour Rand
*Attorney*—Craig, Antonelli, Stewart & Hill ABSTRACT: The present disclosure is directed to a process for treating a hydrocarbon-containing fermentation liquor obtained by culturing the hydrocarbon assimilating micro-organism in a fermentation liquor containing a hydrocarbon as the main carbon source, to separate the hydrocarbon remaining after fermentation and the micro-organism cells from said liquor, which comprises generating microfine air bubbles in the lower portion of the fermentation liquor, thereby causing the hydrocarbon and micro-organism cells to rise to the upper portion of said fermentation liquor, and thereby separating the fermentation liquor into the hydrocarbon-micro-organism cell phase and the water phase.

PROCESS FOR TREATING A HYDROCARBON FERMENTATION LIQUOR

The present invention relates to a process for treating a hydrocarbon fermentation liquor which comprises separating and recovering cells from a fermentation liquor obtained by culturing hydrocarbon-assimilating micro-organisms utilizing various hydrocarbons as the main carbon source. The present invention is also concerned with carrying out an effective purification of the fermentation products accumulated in a fermentation liquor.

In recent years the production of amino acids, organic acids, antibiotics and the like has been effected by culturing micro-organisms having a hydrocarbon assimilability utilizing a cheaper cost hydrocarbon, for example, crude oil, heavy oil, light oil, kerosene, fractional cracked oils thereof and the like as the main carbon source. In the purification and recovery of the objective products accumulated from these fermentation liquors, it is necessary to carry out the removal of the remaining hydrocarbons as well as the separation of the resultant cells on an industrial scale. In order to solve this problem investigations have been made concerning the fundamental properties of the hydrocarbon fermentation liquor. As a result of these studies it has been discovered that all of the fermentation assimilating micro-organisms have a property of an extremely strong affinity for the hydrocarbons used in the fermentation of the raw material. By effectively utilizing this property, a process has been developed according to the present invention for separating and recovering micro-organism cells along with hydrocarbons from a water phase.

One of the objects of the present invention is to provide an improved process for separating the hydrocarbons remaining after fermentation and the micro-organism cells from the fermentation liquor.

Another object of the present invention is to provide a process for separating the hydrocarbons remaining after fermentation and the micro-organism cells from the fermentation liquor, said fermentation liquor being obtained by culturing a hydrocarbon-assimilating micro-organism in a fermentation liquor containing a hydrocarbon as the main carbon source.

A further object of the present invention is to provide a process for the separation of the hydrocarbons remaining after fermentation and the micro-organism cells from the fermentation liquor wherein the fermentation products accumulated in the fermentation medium are effectively purified.

A further object of the present invention is to provide an improved process for the separation of the hydrocarbons remaining after fermentation and the micro-organism cells from the fermentation liquor which can be carried out continuously on an industrial scale.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved process for separating the hydrocarbons remaining after fermentation and the micro-organism cells from the fermentation liquor may be obtained by utilizing the remaining hydrocarbon present in the fermentation liquor after the completion of said fermentation or by adding after fermentation additional hydrocarbon of the same type as used in the fermentation process. According to the present process separation is effected by generating microfine air bubbles in the lower portion of the fermentation liquor thereby causing the hydrocarbon and micro-organism cells to rise to the upper portion of said fermentation liquor where separation of the fermentation liquor into the hydrocarbon-micro-organism cell phase and the water phase can be readily effected.

In general, in a culture liquor utilizing hydrocarbons as a raw material, there are many cases where the raw material hydrocarbon remains or a cell component is broken. It is extremely difficult, as in the case of the existing saccharine fermentation liquors, to remove cells by a centrifugal separation or to remove cells by filtration with a filtering material. Further, the broken cell component and the remaining hydrocarbons are emulsified during the fermentation and this makes it difficult to separate the constituents centrifugally or by filtering. It has been recognized by the present invention that various hydrocarbon-assimilating micro-organisms have a property of sedimentation, that is the ability to become suspended in water. But when these micro-organisms are suspended in a mixed solution of assimilable hydrocarbon and water and after stirring are permitted to sit, the hydrocarbon becomes separated in an upper phase while the water separates to the lower phase. In such a situation, the micro-organism cells are always contained in the hydrocarbon phase, that is the upper phase. Further, by employing this property, the particular cells and the hydrocarbons can be simultaneously removed and separated in the manner of separating the hydrocarbons from the water phase of a culture liquor in which hydrocarbons remained at the completion of the fermentation or in the case where no hydrocarbons remained in the fermentation liquor, by adding thereto the same hydrocarbon utilized as the raw material. Furthermore, as the result of the present process for substantially separating the hydrocarbons and micro-organism cells from the fermentation liquor utilizing said hydrocarbons as a raw material therefor and without employing a special apparatus, the present invention has discovered that the separation could be effectively obtained by generating microfine air bubbles in the fermentation liquor containing the hydrocarbons. That is to say, by utilizing the remaining hydrocarbons in the liquor or by adding the same hydrocarbon after the completion of the fermentation, and by introducing water containing dissolved air into the lower portion of the fermentation liquor under pressure, the dissolved air from the lower portion of the tank rises in the form of microfine bubbles due to the pressure difference which exists. This effects the simultaneous floating-up of the hydrocarbons and the micro-organism cells and thus the separation of said materials from the water phase section of the fermentation liquor in the lower portion of said liquor. The hydrocarbons and the micro-organism cells which have been floated to the upper portion of the fermentation liquor can be reslurried with water and again floated up and separated by means of the microfine air bubbles, thereby effecting separation and recovery of the hydrocarbons and micro-organism cells in the fermentation liquor up to an amount of about 99 percent or more. In addition, in the case of applying said process industrially, it is possible to continuously remove the floating mixture of hydrocarbons and the micro-organism cell from the upper portion of the liquor and a clear liquor from the lower portion while continuously supplying a fermentation-completed liquor and continuously generating air bubbles in the fermentation liquor by dissolving air or other gases therein under an increased pressure in the lower portion of the tank.

The phenomenon of such a strain-separation by means of the float-up system is not observed in the case of using a carbon source other than hydrocarbons, that is a carbon source such as for example a carbohydrate such as starch, glucose and the like. The effect thereof is a peculiar phenomenon observed specifically in a hydrocarbon fermentation liquor.

The present invention is applicable to the separation of cells of hycrocarbon-assimilating micro-organisms from a fermentation liquor. Such micro-organisms include, for example those belonging to the genera Micrococcus, Pseudomonas, Achromobacter, Arthrobacter, Bacillus, Corynebacterium, Flavobacterium, and the like. These micro-organisms are capable of growing in a nutrient medium containing hydrocarbons, for example, n-paraffins having about 5 to 24 carbon atoms, including mixtures of crude fractions containing said hydrocarbons.

As for the fermentation per se, either a synthetic culture medium or a natural nutrient medium is suitable as long as it contains the essential nutrients for the growth of the micro-organism strain employed. Such nutrients are well known in the art and include substances such as a carbon source, a nitrogen source, inorganic compounds and the like which are utilized by the micro-organism employed in appropriate amounts. The fermentation in connection with the present invention is conducted in an aqueous nutrient medium containing a hydrocarbon or a mixture of hydrocarbons as the main carbon source. Such hydrocarbons include straight and branched-chain paraffins (alkanes) having from 5 to 24 carbon atoms, such as n-pentane, n-octane, n-decane, n-hexadecane, isopentane, isoctane, etc., cycloparaffins such as cyclohexane and cyclooctane, straight- and branched-chain olefins such as pentene-2, hexene-1, octene-1, octene-2,etc., cyloolefins such as cyclohexene, aromatic hydrocarbons such as benzene, o-xylene, etc., and mixtures thereof and mixed hydrocarbons such as kerosene, light oils, heavy oils paraffin oils, etc. Small amounts of other carbon courses such as carbohydrates, for example, glucose, fructose, maltose, sucrose, starch, starch hydrolysate, molasses, etc., or any other suitable carbon source such as glycerol, mannitol, sorbitol, organic acids, etc. may be used in the fermentation medium along with the hydrocarbon. These substances may be used either singly or in mixtures of two or more. As a nitrogen source, various kinds of inorganic or organic salts or compounds, such as urea or ammonium salts such as ammonium chloride, ammonium sulfate, ammonium nitrate, ammonium phosphate, etc., or one or more than one amino acid mixed in combination, or natural substances containing nitrogen, such as cornsteep liquor, yeast extract, meat extract, fish meal, peptone, bouillon, casein hydrolysates, fish solubles, rice bran extract, etc., may be employed. These substances may also be used either singly or in combinations of two or more. Inorganic compounds which may be added to the culture medium include magnesium sulfate, sodium phosphate, potassium dihydrogen phosphate, potassium monohydrogen phosphate, iron sulfate or other iron salts, manganese chloride, calcium chloride, etc. Moreover, it may also be necessary to add certain essential nutrients to the culture medium, depending upon the particular micro-organism employed, such as amino acids, for example, aspartic acid, threonine, methionine, etc., and/or vitamins, for example, biotin, thiamine, cobalamin and the like.

Fermentation is conducted under aerobic conditions, such as aerobic shaking of the culture or with stirring of a submerged culture, at a temperature of about 20° to 50° C. and a pH of about 5.0 to 9.0. After about 2 to 5 days of culturing under these conditions, remarkably large amounts of the desired product, e.g. L-glutamic acid are found to be accumulated in the fermentation liquor.

The following examples are given merely as illustrative of the present invention and are not to be considered as limiting. Unless otherwise noted, the percentages therein are by weight.

EXAMPLE 1

To 100 liters of a fermentation liquor containing 1,600 g. of L-glutamic acid and 4.3 percent of remaining n-paraffin obtained by culturing the L-glutamic acid-producing strain, Arthrobacter paraffineus, ATCC 21167 at a pH of 7.2 for 60 hours utilizing 10% (V/V) of n-paraffin as a main carbon source is added 20 liters of water containing dissolved therein air under a pressure of 2 kg./cm.$^2$. The water is jetted through the lower portion of the tank. As a result, the liquor is distinctly separated into two phases, a water phase section in the lower portion of the liquor and a section of mixed n-paraffin and micro-organism cells in the upper portion. The water phase section from the lower portion of the tank is withdrawn. 100 liters of water is again added to the upper phase and 20 liters of water containing dissolved therein air under a pressure of 2 kg./cm.$^2$ is jetted into the lower portion of the tank. The float-up separation is again carried out and the water phase section of the lower portion is separated. The L-glutamic acid recovered in the water phase section is 1,585 g. The recovering percentage is about 99.1 percent and the recovery percentage of the separated cells recovered together with the n-paraffin is 96.2 percent.

EXAMPLE 2

For the purpose of separating cells from 20 liters of a fermentation liquor containing 0.4 percent of remaining kerosene obtained by culturing Arthrobacter roseoparaffineus ATCC 15584 at 30° C. for 4 days utilizing 4.5 percent (V/V) of kerosene as the main carbon source, an additional 0.6 liter of kerosene is added to the liquor with stirring at the time of completion of the fermentation. Then 5 liters of water containing air dissolved therein are added to the lower portion of the fermentation liquor under a pressure of 1.5 kg./cm.$^2$. The liquor is then separated on standing into two phases, a transparent water phase at the lower portion and a phase of kerosene and micro-organism cells in the upper portion. After taking out the transparent section from the lower portion of the tank, the cells are recovered together with the kerosene. The percentage recovery of cells is 95 percent. It should be noted that the separation effect can be increased by the presence of an aggregation agent, and the like in the fermentation liquor.

Since modifications of this invention will be apparent to those skilled in the art, it is not desired to limit the invention to the exact constitution shown and described. Accordingly, all suitable modifications and equivalents may be resorted to which fall within the scope of the present disclosure.

It is claimed:

1. A process for treating a hydrocarbon-containing fermentation liquor obtained by culturing a hydrocarbon assimilable micro-organism in a fermentation liquor containing a hydrocarbon as the main carbon source, to separate the hydrocarbon remaining after fermentation and the micro-organism cells from said liquor, which comprises generating microfine air bubbles in the lower portion of the fermentation liquor, thereby causing the hydrocarbon and micro-organism cells to rise to the upper portion of said fermentation liquor, and thereby separating the fermentation liquor into the hydrocarbon-micro-organism cell phase and the water phase.

2. The process of claim 1, wherein after fermentation, additional hydrocarbon of the same type as used in the fermentation is added to the fermentation liquor.

3. The process of claim 1, wherein the microfine air bubbles are generated by dissolving air in the lower portion of the fermentation liquor.

4. The process of claim 1, wherein the hydrocarbon and micro-organism cells which have been floated to the upper portion of the fermentation liquor are reslurried with water and again floated to the upper portion of the fermentation liquor by microfine air bubbles.

5. The process of claim 1, wherein a continuous process is effected by continuously supplying a fermentation-completed liquor, continuously generating air bubbles in the fermentation liquor and continuously removing the separated mixture of hydrocarbon and micro-organism cells.

6. The process of claim 1, wherein the hydrocarbon assimilating micro-organism is the L-glutamic acid-producing strain Arthrobacter paraffineus ATCC 21167.

7. The process of claim 1, wherein the hydrocarbon assimilating micro-organism is the strain Arthrobacter roseoparaffineus, ATCC 15584.

8. A process for treating a hydrocarbon-containing fermentation liquor obtained by culturing a hydrocarbon assimilating micro-organism belonging to genus Micrococcus, Pseudomonas, Arthrobacter, Achromobacterium, Bacillus, Corynebacterium, or Flavobacterium in a fermentation liquor containing a hydrocarbon as the main carbon source, to separate the hydrocarbon remaining after fermentation and the micro-organism cells from said liquor, which comprises generating microfine air bubbles in the lower portion of the fermentation liquor, thereby causing the hydrocarbon and micro-organism cells to rise to the upper portion of the fermentation liquor and thus separating the fermentation liquor into the hydrocarbon-micro-organism cell phase and the water phase.

9. The process of claim 8, wherein the hydrocarbon is kerosene.

10. The process of claim 8, wherein the hydrocarbon is an n-paraffin, containing from five to 24 carbon atoms.

11. The process of claim 8, wherein the microfine air bubbles are generated by the introduction of water containing dissolved into the lower portion of the fermentation liquor.

12. The process of claim 11, wherein the water phase is removed and the hydrocarbon-micro-organism cell phase is reslurried with water and again separated by the introduction of water containing dissolved air into the lower portion of the fermentation liquor.

* * * * *

UNITED STATES PATENT OFFICE
CERTIFICATE OF CORRECTION

Patent No. 3,630,843         Dated December 28, 1971

Inventor(s) Akira Furuya, Yoshiatsu Aoki and Mikio Takayanagi

It is certified that error appears in the above-identified patent and that said Letters Patent are hereby corrected as shown below:

Title Page, left column, line 7, which now reads:

"Assignee        Kyowa Hakko Kogyo, Ltd."

should read as follows:

-- Assignee        Kyowa Hakko Kogyo Co., Ltd. --

Signed and sealed this 8th day of August 1972.

(SEAL)
Attest:

EDWARD M. FLETCHER, JR.        ROBERT GOTTSCHALK
Attesting Officer              Commissioner of Patents